United States Patent Office 3,657,266
Patented Apr. 18, 1972

3,657,266
v-TRIAZOLYLCOUMARINS
Rudolf Kirchmayr, Binningen, Basel-Land, Switzerland, assignor to Ciba-Geigy Corporation, Ardsley, N.Y.
No Drawing. Filed Sept. 2, 1970, Ser. No. 69,148
Int. Cl. C07d 99/04, 99/06; C09k 1/02
U.S. Cl. 260—308 A
8 Claims

ABSTRACT OF THE DISCLOSURE

New 3-phenyl-7-v-triazolylcoumarins are used as optical brighteners of organic materials. The new coumarins are perpared by condensing the oxime hydrazones obtained by reacting thionaphthenequinone-2-oximes or 2-isonitrosocoumaranones-3 or thionaphthenequinone-1,1-dioxide-2-oximes with 3-phenyl-7-hydrazinocoumarins.

DETAILED DESCRIPTION

The present invention relates to new coumarins substituted in the 3-position by a mononuclear, aromatic carbo- or heterocyclic group, which coumarins contain in the 7-position a v-triazolyl group to which, in the 4,5-position, a coumaran radical, a thionaphthene radical or a 1,1-dioxothionaphthene radical is annularly linked. The invention also relates to the use of these compounds for the optical brightening of organic materials such as polyesters, to the material brightened with these compounds, as well as to a process for the production of the compounds.

3-phenylcoumarins which contain in the 7-position a v-triazolyl-(2)-group which is substituted with a tetramethylene group or with an o-ω-phenylmethylene group or -ethylene group are already known as optical brighteners. They have negligible inherent colour, exhibit in daylight an intense blue-violet to violet fluorescence, and have a better fastness to light than other known brighteners of similar structure.

It has now been found that v-triazolylcoumarins of formula:

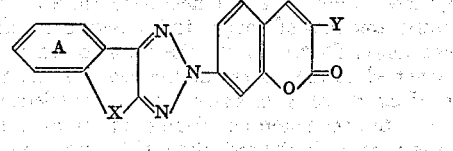

wherein:

X represents oxygen, sulphur or the sulphonyl group, and
Y represents a mononuclear carbo- or heterocyclic aryl group which is in conjugation with the coumarin ring, and the coumarin radical, as well as the benzene nucleus A, can also be substituted by halogen, lower alkyl groups and alkoxy groups, constitute a class having a surprisingly good and brilliant brightening effect, whereby, at the same time, the fastness to light is appreciably better than that of the stated known compounds. Since the new compounds are moreover not so readily volatile, they are particularly suitable for the brightening of organic materials which are exposed to elevated temperatures, such as, e.g. spinning masses.

The v-triazoles according to the invention are in the form of colourless to yellowish crystalline substances. An intense blue to violet fluorescence is exhibited by ionogenically substituted products dissolved in water or polar organic solvents, and by compounds without ionogenic groups dissolved in organic solvents. In small amounts, the new coumarin compounds impart to yellowed organic material, into which they are worked by the usual methods or to which they have been applied by the usual methods, a pure white appearance in daylight, and are therefore valuable optical brighteners.

The mononuclear, carbo- or heterocyclic aryl group Y is preferably an unsubstituted or non-chromogenically substituted phenyl radical.

Especially valuable are compounds of the above formula wherein Y stands for a phenyl group optionally substituted by halogen, such as fluorine, chlorine or bromine, or by an alkyl group having 1–4 carbon atoms, particularly compounds of Formula I:

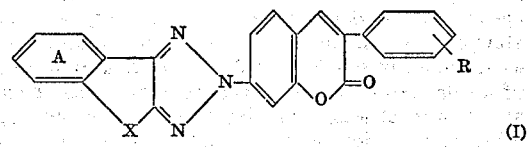

(I)

wherein X represents oxygen, sulphur or the sulphonyl group, and R represents hydrogen, halogen or an alkyl group having 1–4 carbon atoms, and the benzene nucleus A can be substituted by halogen or alkyl groups having 1–4 carbon atoms, preferably such compounds wherein A is unsubstituted or substituted by chlorine or the methyl group, and R denotes hydrogen, chlorine or the methyl group.

If R or the substituents of A are an alkyl group having 1 to 4 carbon atoms it can be for example methyl, ethyl, propyl, isopropyl, butyl or tert.butyl.

The compounds are used for the optical brightening of organic materials. Depending on the substituents, they are especially suitable for specific substrates. Thus compounds with sulphonic or carboxylic acids produce good white effects on cellulose and polyamide materials such as cotton, viscose silk, staple fibre, nylon, polyamides based on caprolactam, wool and silk, whereby the polyamides are preferably brightened from an acid aqueous bath or in the spinning mass, and the cellulose substrates from an acid to alkaline aqueous bath. Products of a cationic nature are particularly suitable for the brightening of textile materials made from polymeric and copolymeric acrylonitrile. Especially valuable are, however, those v-triazolylcoumarins according to the invention containing no ionogenic groups. These products are suitable for optically brightening high-molecular, hydrophobic organic material, particularly for brightening synthetic organic polyplasts, especially in the spinning mass, i.e. synthetic materials obtainable by polymerisation, e.g. polycondensation or polyaddition, such as polyolefins, e.g. polyethylene or polypropylene, also for brightening polyvinyl chloride, particularly however polyesters, especially polyesters of aromatic polycarboxylic acids with polyvalent alcohols such as polyterephthalic acid glycol esters, synthetic polyamides such as nylon-6 and nylon-66, but also cellulose esters such as cellulose acetates.

The optical brightening of the high-molecular hydrophobic organic material is performed, for example, by incorporating into this material small amounts of optical brighteners according to the invention, preferably 0.001 to 1% relative to the material to be brightened, optionally together with other substances such as softeners, stabilisers or pigments. The brighteners can be worked into the synthetic materials, e.g. dissolved in softeners such as dioctylphthalate, or together with stabilisers such as dibutyl tin dilaurate or sodium pentaoctyl tripolyphosphate, or together with pigments such as, e.g. titanium dioxide. Depending on the nature of the material to be brightened, the brightener may also be dissolved in the monomers before polymerisation, in the polymer mass, or together with the polymers in a solvent. The material pretreated in this manner is afterwards processed into the desired ulitmate form by methods known per se, such as calendering, pressing, extrusion, coating, moulding and, in particular, by spinning and stretching. The brighteners can also be worked into finishings, e.g. into finishings for textile fibres such as polyvinyl alcohol, or into resins or resin pre-condensates such as, e.g. methylol compounds of ethylene urea, which are used for the treatment of textiles.

Preferably, however, high-molecular organic material is brightened in the form of fibres. For the brightening of these fibre materials, an aqueous dispersion of v-triazoles of Formula I according to the invention is advantageously used. The brightener dispersion has in this case preferably a content of 0.005–0.5% of the v-triazole according to the invention, relative to the fibre material. In addition, the dispersion may contain auxiliaries such as dispersing agents, e.g. condensation products of fatty alcohols or alkylphenols containing 10 to 18 carbon atoms, with 15 to 25 moles of ethylene oxide; or condensation products of alkylmono- or polyamines containing 16 to 18 carbon atoms, with at least 10 moles of ethylene oxide, organic acids such as formic acid, oxalic acid or acetic acid, detergents, swelling agents such as di- or trichlorobenzenes, wetting agents such as sulphosuccinic acid alkyl esters, bleaching agents such as sodium chlorite, peroxides or hydrosulphites, as well as, optionally, brightening agents of other classes such as, e.g. stilbene derivatives having affinity to cellulose.

The brightening of the fibre material with the aqueous brightener dispersion is performed either by the exhaust process, at temperatures of preferably 30 to 150° C., or by the padding process. In the latter case, the material is impregnated, e.g. with a 0.2–0.5% brightener dispersion, and then finished, e.g. by a dry or moist heat treatment, e.g. by steaming at 2 atm., or, after drying, by a short dry heating to 180–220° C., whereby, optionally, the fabric is also simultaneously fixed. The fibre material treated in this manner is finally rinsed and dried.

High-molecular organic material optically brightened according to the invention, especially the synthetic material brightened by the exhaust process, has a pleasing, pure white, blue-violet to bluish fluorescent appearance.

The new brighteners can be produced according to the invention by reacting in weakly acid medium an oxime of the formula

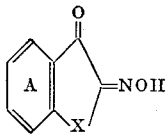

with a coumarinylhydrazine of the formula

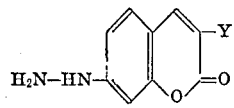

to give the corresponding oxime hydrazone; and converting this with the aid of a condensation agent into a compound of the Formula I. In the formulae, X denotes oxygen, sulphur or the sulphonyl group, Y denotes a mononuclear carbo- or heterocyclic aryl group which is in conjugation with the coumarin ring. The benzene nucleus A, as well as the coumarin ring, can also be substituted by halogen, lower alkyl groups and/or alkoxy groups.

It is advantageous in the first stage to operate in acetic acid medium at elevated temperature. Used as condensation agents in the second stage are protonic acids or acid anhydrides, whereby condensation is performed with the exclusion of water and, optionally, with heating.

Suitable ring-closing protonic acids are, in the first place, e.g. hydrohalic acids; effective acid anhydrides are, e.g. the inorganic anhydrides: phosphorus pentoxide and sulphur trioxide, the mixed inorganic-organic anhydrides such as alkanoyl and aroyl, alkylsulphonyl and arylsulphonyl halides, e.g. acetyl chloride, benzoyl chloride, toluene sulphochloride, as well as the purely organic anhydrides such as acetic anhydride, benzoic acid anhydride, also the mixed anhydride of formic acid and acetic acid.

The condensation can be performed in the presence of organic solvents inert under the reaction conditions. Suitable as such are high-boiling hydrocarbons and halogenated hydrocarbons, e.g. chlorobenzene, dichlorobenzenes, xylenes; it is also possible to use inert, slightly or more strongly basic solvents, e.g. dimethylformamide, dimethylacetamide, or pyridine, picolines, quinolines. Depending on the substituents of the oxime hydrazones, the ring closure can be effected either by simply allowing the reaction mixture to stand, or by heating it. Suitable reaction temperatures are those between room temperature and 250° C., preferably 200° C. Favourable results with regard to yields and purity of the final products are sometimes produced by the presence of basic catalysts such as anhydrous alkali metal salts or alkaline-earth metal salts of organic acids, e.g. sodium acetate or potassium acetate.

As a modification of the described production process, the initially formed oxime hydrazone can be converted with an oxidation agent into a v-triazole oxide of the formula

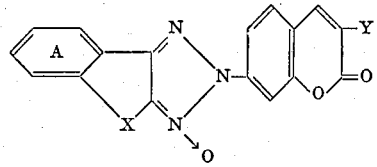

and this then reduced with nascent hydrogen to a compound of Formula I.

Oxidative ring closure can be effected by the action of the most diverse oxidising agents; it is advisable to thereby operate in solvents resistant to oxidation. In acid solution, e.g. acetic acid solution, bichromate or hydrogen peroxide are suitable oxidising agents; in basic solvents, such as pyridine or pyridine/water mixtures, potassium ferricyanide is, for example, suitable.

The generally applicable and therefore preferred process consists in oxidation with copper-(II)-sulphate in pyridine-water. It is not necessary thereby for stoichiometric amounts of copper to be used, since the monovalent copper formed during the reaction can be continually converted in the course of the reaction, by the blowing in of air or oxygen, again into the bivalent stage.

For the reduction of triazole oxides to triazoles using known methods, the reduction with base metals and acids, such as zinc dust in acetic acid or in acetic acid/water mixtures, is advantageously chosen. It is also possible to use for the reduction, however, salts of reducing acids of sulphur or phosphorus.

In the following examples, the temperatures are stated in degrees centigrade.

EXAMPLES 1–5

The optical brightener given in the following table under Example 1 is produced in the following manner:

33.7 g. of thionaphthenequinone-2-oxime and 68.0 g. of 3-phenyl-7-hydrazinocoumarin with a content of 70.1% are acidified in 400 ml. of ethylene glycol monomethyl ether with 100 ml. of 50% acetic acid, and heated to 70–80°. Stirring is maintained for 6 hours at this temperature, whereby α-oximinohydrazone precipitates in the form of red-brown crystals. After all of the 3-phenyl-7-hydrazinocoumarin is consumed, the condensation product is filtered off under suction, washed with ethanol, and dried.

An amount of 58.0 g. of the thus obtained α-oximinohydrazone is then stirred with 50.0 g. of anhydrous potassium acetate in 400 ml. of acetic acid anhydride for 30 minutes at 70°. The reaction mixture is then brought to reflux temperature, and stirred for 8 hours at this temperature. The crystals precipitating on cooling are washed with ethanol, hot water, and again with ethanol. After recrystallisation from chlorobenzene is obtained, using decolourising charcoal, the brightener 1, given in the following table, in the form of light-yellow crystals which dissolve in chlorobenzene with an intensely blue-violet fluorescence.

The brighteners given under Examples 2–5 are produced in an analogous manner. In the case of the brighteners given under 4 and 5, 3-(4-chlorophenyl)-7-hydrazinocoumarin and 3-p-tolyl-7-hydrazinocoumarin, respectively, are used instead of 3-phenyl-7-hydrazinocoumarin. Instead of thionaphthenequinone-2-oxime, in the case of the brighteners listed under 2 and 3, 5-chlorothionaphthenequinone-2-oxime and 5-methylthionaphthenequinone-2-oxime, respectively, are condensed with 3-phenyl-7-hydrazinocoumarin, and these condensation products cyclised, as described above, to triazole.

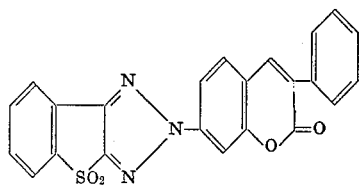

| Example | R₁ | R₂ | R₃ | R₄ | R₅ | M.P |
|---|---|---|---|---|---|---|
| 1 | H | H | H | H | H | 267° |
| 2 | H | H | Cl— | H | H | 298° |
| 3 | H | H | CH₃— | H | H | 280° |
| 4 | Cl— | H | H | H | H | 305° |
| 5 | CH₃— | H | H | H | H | 288° |
| 6 | n-C₄H₉ | H | H | H | H | ------ |

EXAMPLES 7–13

The brightener given under 7 in the following table is produced in the following manner:

A solution of 18.0 g. of 2-isonitrosocoumaranone-3- (Gaz. chim. ital. 56, 768) and 25.2 g. of 3-phenyl-7-hydrazinocoumarin in 150 ml. of ethylene glycol monoethyl ether is heated to 70°; it is then acidified with 50 ml. of 50% acetic acid, and allowed to stand for 12 hours at 70–80°, whereby α-oximinohydrazone crystallises out in the form of reddish-brown-crystals. These are filtered off under suction, washed with methanol, and dried.

An amount of 20.0 g. of the thus obtained α-oximinohydrazone is refluxed with 20.0 g. of anhydrous potassium acetate in 50 ml. of acetic acid anhydride for 5 hours. The crystal cake formed during cooling of the reaction mixture is filtered off with suction; it is then washed with methanol and with hot water. After a recrystallisation from chlorobenzene is obtained, using decolourising charcoal, the brightener listed in the table under 6, in the form of light-yellow crystals which dissolve in chlorobenzene with a blue-violet fluorescence.

The brighteners given under 8–13 are produced in an analogous manner. For the brighteners given under 7 and 8 are used, instead of 3-phenyl-7-hydrazinocoumarin, 3-(4-chlorophenyl - 7 - hydrazinocoumarin and 3-p-tolyl-7-hydrazinocoumarin, respectively. In the case of Examples 9–12, 2-isonitroso-7-methylcoumaranone-3, or 2-isonitroso-6-methylcoumaranone-3, or 2-isonitroso - 5-methylcoumaranone-3, or 2 - isonitroso-5-chlorocoumaranone-3- is condensed with 3-phenyl-7-hydrazino-coumarin; and these condensation products are then cyclised to the corresponding triazoles.

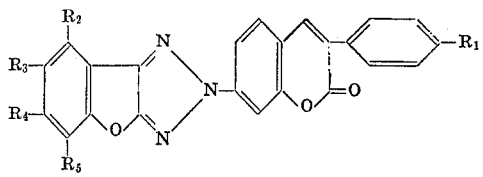

| Example | R₁ | R₂ | R₃ | R₄ | R₅ | M.P |
|---|---|---|---|---|---|---|
| 7 | H | H | H | H | H | 271° |
| 8 | CH₃— | H | H | H | H | 302° |
| 9 | Cl— | H | H | H | H | 299° |
| 10 | H | H | H | H | CH₃— | 270° |
| 11 | H | H | H | CH₃— | H | 307° |
| 12 | H | H | CH₃— | H | H | 272° |
| 13 | H | H | Cl— | H | H | >270° |

EXAMPLE 14

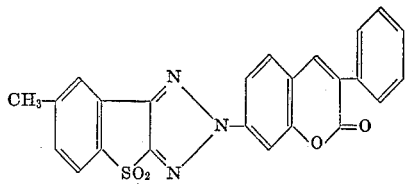

An amount of 23.3 g. of thionaphthenequinone-1,1-dioxide-2-oxime and 25.2 g. of 3-phenyl-7-hydrazinocoumarin are dissolved at 70° in 200 ml. of ethylene glycol monomethyl ether. This solution is acidified with 50 ml. of 50% acetic acid, and allowed to stand at 70–80° for 12 hours, whereby α-oximinohydrazone crystallises out in the form of orange crystals. These are separated, washed with ethanol, and dried.

15.0 g. of the thus obtained α-oximinohydrazone are heated in 200 ml. of pyridine to reflux temperature. A solution of 25.0 g. of copper sulphate pentahydrate in 1000 ml. of water is added dropwise within one hour, and stirring thereupon proceeds for a further 5 hours at the reflux temperature. The formed triazole oxide is filtered off under suction, and refluxed for 6 hours in 250 ml. of chlorobenzene with 5.0 g. of zinc dust and 10 ml. of acetic acid. Filtration is then carried out hot, and coumarinyltriazole of the above given formula crystallises out in the filtrate in the form of light-yellow crystals having a melting point of 305–307°.

The compound is also prepared as follows: 4.0 g. of the brightener 1 in 400 ml. glacial acetic acid are heated to 90–100°. 4.0 g. of perhydrol are added dropwise to the obtained suspension within 20 minutes at this temperature. The mixture is stirred for 8 hours at 100° and thereupon filtration is carried out hot.

The obtained crystals are washed with ethanol and then crystallised out from chlorobenzene containing some zinc dust and glacial acetic acid. The brightener 14 is obtained in the form of light-yellow crystals of the same melting point.

EXAMPLE 15

If, instead of 23.3 g. of thionaphthenequinone-1,1-dioxide-2-oxime, an equivalent amount of 5-methylthionaphthenequinone-1,1-dioxide-2-oxime is used, with the procedure being analogous to that described in Example 14, then the compound is obtained of the following formula:

EXAMPLE 16

To 100 ml. of water are added, as carrier, 0.2 g. of trichlorobenzene. A solution is prepared of the optical brightener according to Example 1 by dissolving 1 g. of the brightener in 1000 ml. of ethyleneglycol monoethyl ether. An amount of 1.5 ml. of this stock solution is added to the above described mixture. This aqueous dispersion containing the brightener is heated to 60°; and 3 g. of polyester fabric are then introduced into the solution. The temperature is raised within 10–15 minutes to 95–98°, and the bath is allowed to stand at this temperature for 1 hour. The fabric is then rinsed in cold running water, and subsequently dried for 20 minutes at 60°. The thus treated fabric exhibits a clear brightened effect.

If, instead of the stated brightener, one according to one of the Examples 2, 3, 4, 7, 11, 12 or 14 is used, then a similar effect is obtained.

"Trichlorobenzene as carrier" signifies, in this and in the following examples, a mixture of 76 parts of trichlorobenzene and 27 parts of various emulsifiers.

EXAMPLE 17

To 100 ml. of water are added 0.2 g. of trichlorobenzene, 0.2 g. of 80% sodium chlorite, 0.2 g. of sodium nitrite and 0.2 g. of oxalic acid.

A solution is prepared of the optical brightener according to Example 3 by dissolving 1 g. of the brightener in 1000 ml. of dimethylformamide. An amount of 1.5 ml. of this stock solution is added to the above described mixture. This aqueous dispersion containing the brightener is heated to 60°; and 3 g. of polyester fabric are then introduced into the solution. The temperature is raised within 15–20 minutes to 95–98°, and the bath is allowed to stand at this temperature for 60 minutes. The fabric is afterwards rinsed in cold running water for 2 minutes, and subsequently dried for 20 minutes at 60°. The thus treated fabric exhibits a clear brightened effect.

Instead of the oxalic acid, it is also possible to use an equivalent amount of another inorganic or organic acid.

EXAMPLE 18

To 290 ml. of water are added 0.15 ml. of trichlorobenzene and 0.3 ml. of alkylpolyglycol ether.

A solution is prepared of the optical brightener according to Example 1 by dissolving 1 g. of the brightener in 1000 ml. of ethylene glycol monoethyl ether. An amount of 7.5 ml. of this stock solution is added to the above described solution. This aqueous dispersion containing the brightener is heated to 60°; and 15 g. of polyester fabric are are then introduced into the solution. The temperature is raised within 15–20 minutes to 130°, and the bath is allowed to stand at this temperature for 30 minutes; it is then cooled within 10–15 minutes to 60°. The fabric is afterwards rinsed for 2 minutes in cold running water, and subsequently dried for 20 minutes at 60°.

The thus treated fabric exhibits a clear brightened effect.

If, instead of the stated brightener, one according to Example 2, 7 or 10 is used, then similar brightened effects are obtained.

EXAMPLE 19

A solution is prepared of the optical brightener according to Example 1 by dissolving 1 g. of the brightener in 1000 ml. of dimethylformamide. A polyester fabric is padded with this solution at 20° (squeezing effect 50–60%, roller pressure 30 kg./cm.², speed 3 m./min.). The fabric is dried for 20 minutes at 60°.

The dried fabric is subsequently fixed for 30 seconds at 200°.

The thus treated fabric exhibits a clear brightened effect.

A similar brightened effect is obtained using an optical brightener according to Example 2, 4, 5, 7, 10, 11 or 12, applying otherwise the same procedure.

EXAMPLE 20

A ca. 0.1% dispersion is prepared of the optical brightener according to Example 1 by diluting 10 g. of a 10% sand milling with 1000 ml. of water, and adding 2 g. of di-n-octyl sodium sulphosuccinate. A polyester fabric is padded at 20° with this dispersion (squeezing effect 50–60%, roller pressure 30 kg./cm.², speed 3 m./min.). The fabric is dried for 20 minutes at 60°.

The dried fabric is subsequently fixed for 30 seconds at 200°.

The fabric treated in this manner exhibits a clear brightened effect.

Similar results are obtained using an optical brightener according to Example 2, 7, 12 or 14.

EXAMPLE 21

To 80 ml. of water are added 0.2 g. of di-n-octyl sodium sulphosuccinate and 0.2 g. of alkylpolyglycol ether.

A solution is prepared of the optical brightener according to Example 1 by dissolving 10 g. of the brightener in 1000 ml. of dimethylformamide=stock solution I.

A solution is produced of the optical brightener of the formula $$(HOCH_2CH_2)_2N-\underset{C_6H_5HN}{\underset{N}{\underset{\|}{\overset{N}{\underset{\|}{\overset{N}{\bigg\langle}}}}}}-HN-\bigg\langle\underset{SO_3Na}{\overset{SO_3Na}{\bigg\rangle}}-CH=CH-\bigg\langle\underset{SO_3Na}{\bigg\rangle}-NH-\underset{NHC_6H_5}{\underset{N}{\underset{\|}{\overset{N}{\underset{\|}{\overset{N}{\bigg\rangle}}}}}}-N(CH_2CH_2OH)_2$$

by dissolving 20 g. in 1000 ml. of water=stock solution II.

To the initially described solution are added 10 ml. of each of the stock solutions I and II. A pre-bleached polyester cotton fabric is padded with this dispersion (67:33 parts mixed, squeezing effect 50–60%, roller pressure 30 kg./cm.², speed 3 m./min.).

The fabric is dried for 20 minutes at 60°. The dry fabric is subsequently fixed for 30 seconds at 200°. The thus treated fabric exhibits a clear brightened effect.

The optical brightener according to Example 7 has a similar effect. A fabric made from 50 parts of polyester and 50 parts of cotton is brightened in the same manner.

EXAMPLE 22

To 290 ml. of water are added 0.3 ml. of alkylpolyglycol ether and 0.15 ml. of trichlorobenzene as carrier. A solution is prepared of the optical brightener according to Example 1 by dissolving 1 g. of the brightener in 1000 ml. of ethylene glycol monomethyl ether. An amount of 4.5 ml. of this stock solution is added to the above described solution. This aqueous dispersion containing the brightener is heated to 60°; to the solution are then added 15 g. of polyester fabric. The temperature is raised within 15–20 minutes to 130° and maintained there for 30 minutes; the bath is then cooled in the course of 10–15 minutes to 60°. The fabric is afterwards rinsed for 2 minutes in cold running water, and dried for 20 minutes at 60°. The dry fabric is subsequently thermofixed for 30 seconds at 200°.

The thus treated fabric exhibits a clear brightened effect.

Similar effects are obtained using an optical brightener according to Example 2, 3, 7, 9 or 14.

EXAMPLE 23

To 95 ml. of water are added 0.06 ml. of 40% acetic acid and 0.06 ml. of alkylpolyglycol ether. A solution is prepared of the optical brightener according to Example 1 by dissolving 1 g. of the brightener in 1000 g. of dimethylformamide. An amount of 6 ml. of this stock solution is added to the above described solution. This aqueous dispersion containing the brightener is heated to 40°; and 3 g. of acetate fabric are introduced into the solution. The temperature is raised in the course of 10–15 minutes to 75–80°, and the bath is allowed to stand at this temperature for 30 minutes. The fabric is then rinsed for 2 minutes in cold running water, and afterwards dried for 20 minutes at 60°.

The thus treated fabric exhibits a clear brightened effect.

EXAMPLE 24

To 95 ml. of water are added 0.06 ml. of 40% acetic acid and 0.06 ml. of alkylpolyglycol ether. A solution is prepared of the optical brightener according to Example 9 by dissolving 1 g. of the brightener in 1000 ml. of ethylene glycol monomethyl ether. An amount of 6 ml. of this stock solution is added to the above described solution. This aqueous dispersion containing the brightener is heated to 60°; and 3 g. of triacetate fabric are then introduced into the solution. The temperature is raised within 10–15 minutes to 95–98°, and the bath is left at this temperature for 30 minutes. The fabric is then rinsed for 2 minutes in cold running water, and subsequently dried for 20 minutes at 60°.

The thus treated fabric exhibits a clear brightened effect.

EXAMPLE 25

To 100 ml. of water are added 0.06 g. of 40% acetic acid and 0.06 g. of alkylpolyglycol ether. A solution is prepared of the optical brightener according to Example 5 by dissolving 1 g. of the brightener in 1000 ml. of dimethylformamide. An amount of 1.5 ml. of this stock solution is added to the above described solution. This aqueous dispersion containing the brightener is heated to 60°; and 3 g. of polypropylene fabric are then introduced into the solution. The temperature is raised within 10–15 minutes to 95–98° and the bath is left at this temperature for 30 minutes. The fabric is then rinsed for 2 minutes in cold running water, and subsequently dried for 20 minutes at 60°.

The thus treated fabric exhibits a clear brightened effect.

Similar effects are obtained by using, instead of the stated brightener, one according to Example 10, 11 or 12.

EXAMPLE 26

To 100 ml. of water are added 0.06 g. of alkylpolyglycol ether. A solution is prepared of the optical brightener according to Example 2 by dissolving 1 g. of the brightener in 1000 ml. of ethylene glycol monomethyl ether. An amount of 3 ml. of the stock solution is added to the above described solution. This aqueous dispersion containing the brightener is heated to 60°; and 3 g. of nylon fabric are then introduced into the solution. The temperature is raised within 10–15 minutes to 92–95°, and the bath is left at this temperature for 30 minutes. The fabric is afterwards rinsed in cold running water for 2 minutes, and then dried for 20 minutes at 60°

The thus treated fabric exhibits a clear brightened effect.

Similar effects are obtained using one of the optical brighteners 3, 5, 8, 9 or 12, with otherwise the same procedure.

EXAMPLE 27

To 100 ml. of water are added 0.12 ml. of 85% formic acid and, in the case of non-water-soluble brighteners, additionally 0.06 g. of alkylpolyglycol ether. A solution is prepared of the optical brightener according to Example 3 by dissolving 1 g. of the brightener in 1000 ml. of ethylene glycol monomethyl ether. An amount of 3 ml. of this stock solution is added to the above described solution. This aqueous dispersion containing the brightener is heated to 60°; and 3 g. of polyamide fabric are introduced into the solution. The temperature of the bath is raised within 10–15 minutes to 92–95°, and it is allowed to stand at this temperature for 30 minutes. The fabric is then rinsed for 2 minutes in cold running water, and afterwards dried for 20 minutes at 60°.

The thus treated fabric exhibits a clear brightened effect.

A similar effect is obtained using a brightener according to Example 7 or 10.

EXAMPLE 28

To 290 ml. of water are added 0.6 g. of a 70% stabilised sodium dithionite as reducing agent, 0.6 g. of a mixture of synthetic detergents, 0.15 g. of a metal-complex-forming agent and 0.06 g. of alkylpolyglycol ether.

A solution is prepared of the optical brightener according to Example 2 by dissolving 1 g. of the brightener in 1000 ml. of dimethylformamide. An amount of 10 ml. of this stock solution is added to the above described solution. This aqueous dispersion containing the brightener is heated to 60°; and 15 g. of nylon fabric are introduced into the solution. The temperature is raised within 15 to 20 minutes to 120° and the bath is allowed to stand at this temperature for 30 minutes. The bath is then cooled within 10 to 15 minutes to 60°. The fabric is afterwards rinsed in cold running water for 2 minutes, and then dried for 20 minutes at 60°.

The thus treated fabric exhibits a clear brightened effect.

A similar result is obtained using an optical brightener of the Example 1, 3 or 7.

EXAMPLE 29

100 parts of polypropylene with 0.5 part of titanium dioxide and 0.05 part of the optical brightener according to Example 5 are homogenised at 200° in a kneader. The melt is spun through spinning nozzles, by known methods, under inert gas at 2–3 atm. and at a temperature of 280–300°. The thus obtained polypropylene threads are distinguished by a high degree of whiteness.

EXAMPLE 30

1000 parts of polyester granulate from polyterephthalic acid ethylene glycol ester are intimately mixed with 0.25 parts of the optical brightener according to Example 1; the mixture is then spun under nitrogen from an extruder at a temperature of 265–285°, in a known manner, through a spinning-nozzle to form threads. The thus obtained polyester threads are beautifully brightened.

Similarly brightened threads are obtained using one of the optical brighteners described in the Examples 2–15.

EXAMPLE 31

In a high-grade alloy steel autoclave provided with a stirrer, a gas-inlet tube, a vacuum arrangement, a descending condenser and a heating jacket, 388 g. of benzene-1,4-dicarboxylic acid dimethyl ester, 300 g. of 1,2-ethanediol and 0.4 g. of antimonous oxide are heated, whilst pure nitrogen is being blown through, to 200° external temperature, and this temperature is maintained for 3 hours, whereby methanol slowly distills off. With the exclusion of air, 0.4 g. of the optical brightener according to Example 1, dissolved in 40 g. of 1,2-ethanediol, are carefully fed into the autoclave, after the temperature has been allowed to fall to 190°. After the addition is completed, the temperature is raised within one hour to 285° external temperature, whereby 1,2-ethanediol distills off. The autoclave is then put under vacuum, the pressure slowly reduced to 0.2 torr, and condensation completed during three hours under these conditions. Vigorous stirring is maintained during these operations. The liquid condensation polymer is then extracted with nitrogen through the nozzle in the base. From the thus obtained polymer it is possible to produce monofilaments having a brilliant white appearance.

Likewise good results are obtained by using one of the brighteners described in Examples 2–15.

EXAMPLE 32

An amount of 2 g. of the optical brightener according to Example 1 is dissolved in 40 ml. of N-methylpyrrolidine; and the solution is then poured into 960 ml. of tetrachloroethylene. A polyester fabric is padded with this solution at 20°; the fabric is then squeezed out at a speed of 10 m./min., between rollers with a pressure of 30 kg./cm.$^2$, to the extent of 80% relative to the weight of the material. The padded material is dried for 1 minute at 60°, and afterwards thermofixed for 30 seconds at 200°.

The thus treated polyester material has a high and brilliant degree of whiteness.

The brightener according to Example 7 can be used in the same manner for the brightening of polyester fabric.

What I claim is:

1. Coumarin compounds of the Formula I:

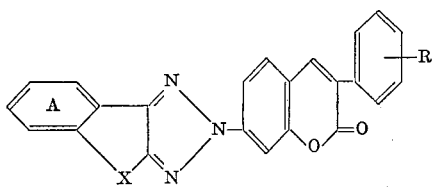

wherein X represents oxygen, sulphur or the sulphonyl group, and R represents hydrogen, halogen or an alkyl group having 1–4 carbon atoms, and the benzene nucleus A can be substituted by halogen or alkyl groups having 1–4 carbon atoms.

2. Coumarin compounds according to claim 1 of the Formula I, wherein A is unsubstituted and R represents hydrogen.

3. Coumarin compounds according to claim 1 of the Formula I, wherein R represents chlorine or the methyl group.

4. Coumarin compounds according to claim 1 of the Formula I, wherein A is substituted by chlorine or a methyl group.

5. A coumarin compound according to claim 1 which is

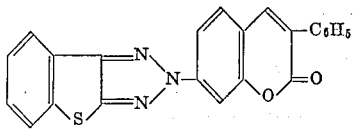

6. A coumarin compound according to claim 1 which is

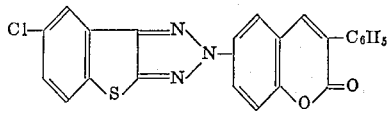

7. A coumarin compound according to claim 1 which is

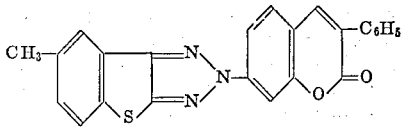

8. A coumarin compound according to claim 1 which is

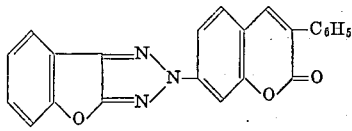

References Cited
UNITED STATES PATENTS 3,542,689  11/1970  Kirchmayr et al. ___ 252—301.2

ALTON D. ROLLINS, Primary Examiner

U.S. Cl. X.R.

8—1 W; 117—33.5 T; 252—301.2 W; 260—330.5, 332, 343.2 R, 346.2 R